Patented July 15, 1941

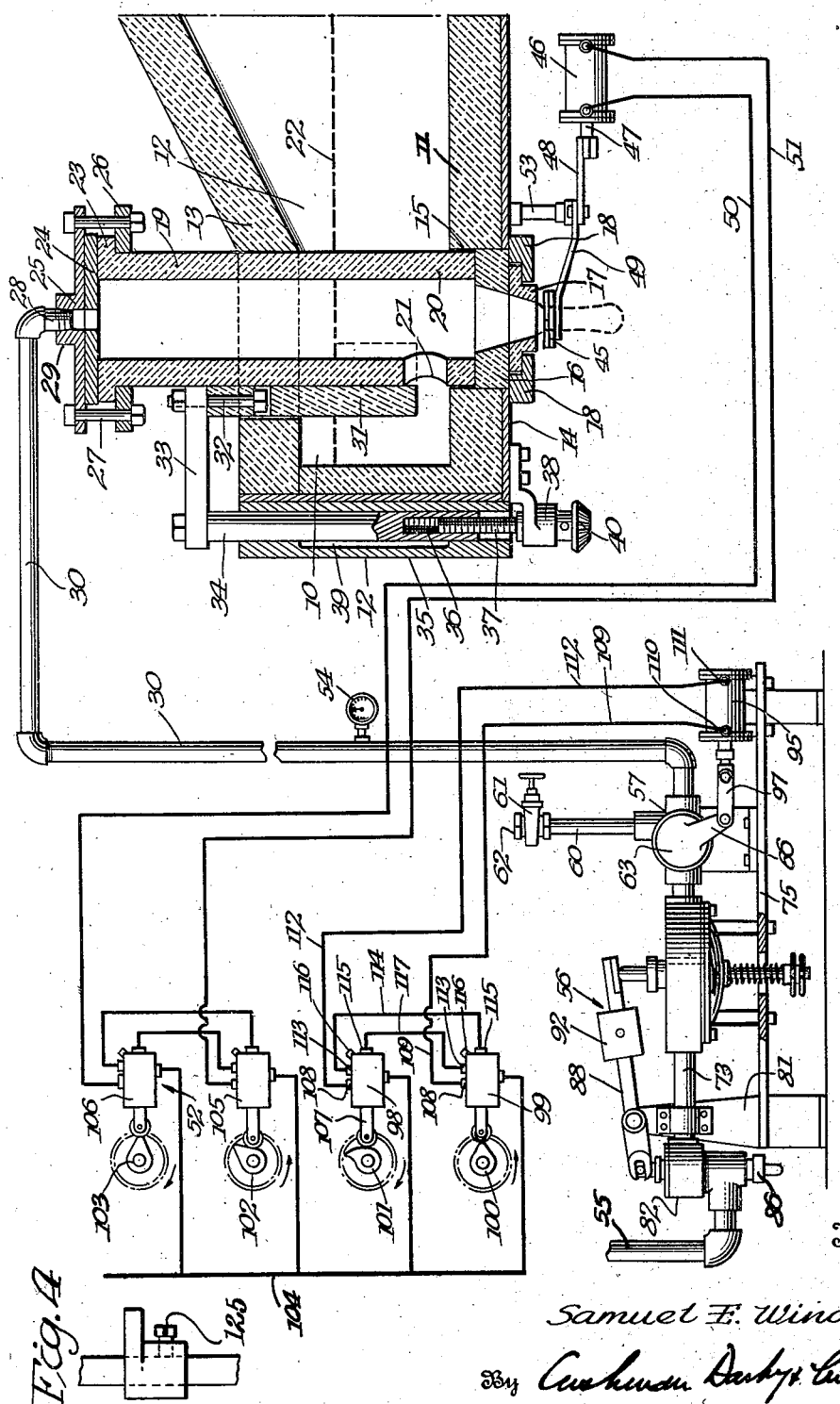

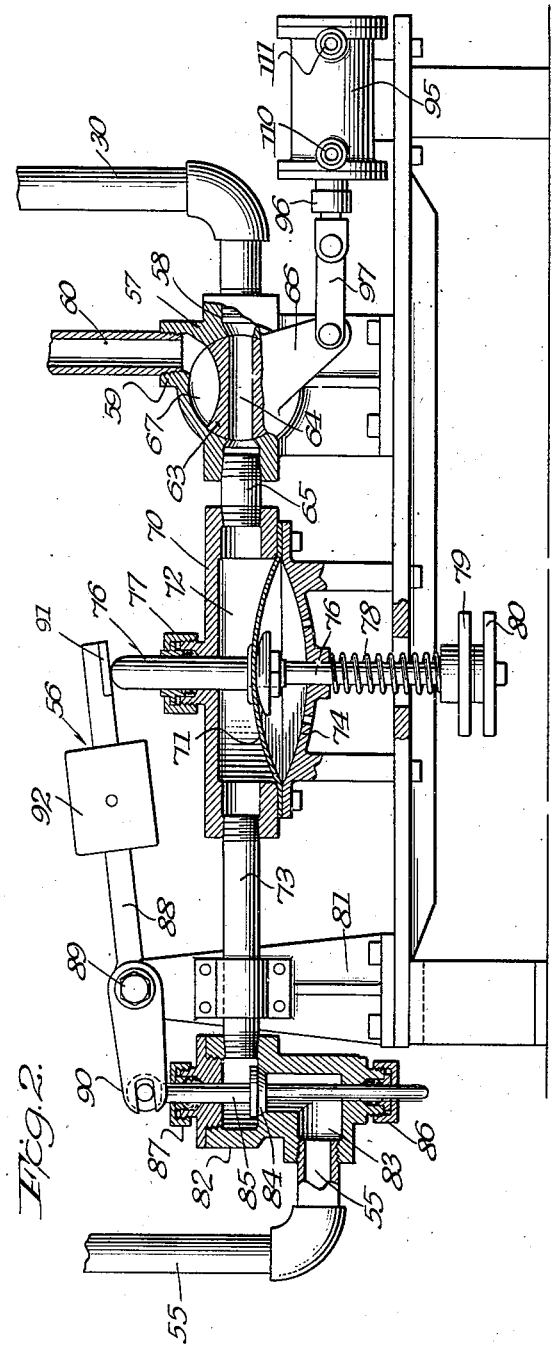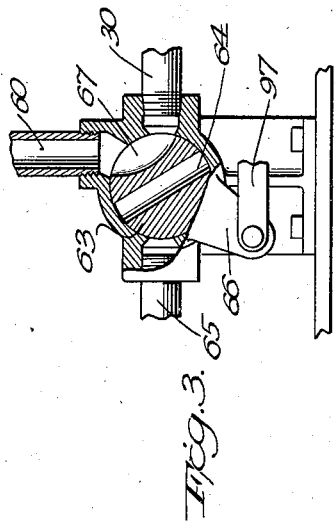

2,249,371

UNITED STATES PATENT OFFICE 2,249,371

GLASS FEEDER

Samuel E. Winder, Baltimore, Md., assignor to Crown Cork & Seal Company, Inc., Baltimore, Md., a corporation of New York Application December 27, 1937, Serial No. 181,943

15 Claims. (Cl. 49—55)

This invention relates to a new and improved glass feeder, adapted to deliver charges of molten glass from a supply body to a forming machine or the like. The invention is concerned with improvements in feeders of the type wherein the flow of molten glass through a discharge orifice in the floor of a forehearth is controlled, charges of glass are sheared therefrom, and the flow is arrested or retarded at substantially the time of shearing, or, in some cases, reversed to lift the sheared stub from the shears. Glass feeders of this general type are known in the art, and the present invention is particularly concerned with a plurality of novel adjustable features, which make the apparatus more flexible and which permit a more accurate control of the size, shape, and weight of the charges than has been possible heretofore.

A primary object of the invention is to provide a feeder which will deliver its mold charges under the influence of gravity and normal atmospheric air pressure only, and without applying any positive extrusive force to the glass. Nothing other than gravity and the force resulting from the hydrostatic head of the molten glass above the discharge orifice is employed to cause the glass to flow.

It is a further object of the invention to provide a feeder wherein the flow of glass is retarded, arrested, or reversed by subjecting the glass in the forehearth above the discharge opening to a suitable, adjustable amount of partial vacuum. By periodically reducing the air pressure above the glass in the discharge orifices to a point below normal, atmospheric air pressure below the glass in the discharge orifice will retard, arrest, or reverse the downward flow of glass. Thus, it is a primary object of the invention to provide a feeder which operates on a cycle alternately employing partial vacuum and atmospheric air pressure only, no super-atmospheric pressure or other positive extruding force being applied to the glass.

A further object of the invention is to provide, in combination with a feeder of the class described, an improved vacuum regulator which serves to provide a constant but adjustable source of vacuum of relatively low degree.

Other and further objects and advantages of the invention will be apparent to one skilled in the art, from a consideration of the preferred embodiment of the invention shown in the accompanying drawings and described below.

In the drawings:

Figure 1 is a diagrammatic layout of the feeder, showing the forehearth and associated parts in vertical section and the air control apparatus inside elevation.

Figure 2 is an enlarged, longitudinal vertical section of the air control apparatus.

Figure 3 is a section of the control valve in a different position.

Figure 4 is a side elevation of an adjustable cam, shown diagrammatically in Figure 1.

A conventional boot or forehearth extension of a glass furnace is shown at 10, comprising a floor 11 of refractory material, side walls 12, and a roof 13. In accordance with the usual practice, appropriate burners may be associated with the forehearth to maintain the glass therein at the proper temperature. Preferably, the forehearth is enclosed within a metallic shell or casing 14. The floor of the forehearth is provided with an opening 15 in which there is positioned a refractory ring 16 and a removable orifice ring 17. The latter may be removably secured in place by any appropriate means, such as the brackets 18, secured to the metal casing 14. Above the bottom ring 16 there is positioned a refractory tube or air bell 19, having its lower end 20 submerged in the glass and substantially contacting the ring 16. The bell 19 is provided with an opening 21 in its side, near the lower end of the bell and below the normal glass level 22. The upper end of the bell is flanged, as at 23, and a fire clay disc 24 is clamped upon the flange by means of an upper iron disc 25 and a lower metallic annulus 26. Bolts 27 or the like maintain the parts in the relation shown and provide a substantially airtight closure for the upper end of the bell. An air pipe 28 is threaded in an upstanding hollow central boss 29 formed integrally with the upper disc 25. The pipe 28 is connected by a suitable air line 30 to the air control apparatus hereinafter described.

Means are provided for varying the effective size of the side opening 21 in the bell 19. Preferably, this means takes the form of a vertically adjustable gate 31 formed of refractory material and having wing portions extending around the exterior surface of the bell in the glass beyond the sides of the opening 21. The gate is supported at its upper end by a bolt 32 or the like from a horizontal hanger 33. The latter is secured to a vertically disposed sleeve 34 mounted in a tubular bracket 35 on the front end or side of the forehearth. The sleeve 34 is provided with a centrally, threaded bore 36 in which there is disposed similarly threaded shaft 37, rotatably mounted in a bearing bracket 38 bolted to the casing 14. By means of a feather or spline 39, the sleeve 34 is restrained against rotation, but endwise movement in the bracket 36 is permitted. A gear 40 on the lower end of the threaded shaft 37 is preferably connected by means of a similar gear and a shaft to a hand wheel, not shown, whereby the threaded rod 37 may be rotated to raise and lower the sleeve 34 and the gate 31, to vary the effective size of the opening 21.

A pair of shear blades 45 are mounted in spaced relation below the orifice ring 17, to shear charges from the stream of glass flowing therethrough. The shears are represented diagrammatically, since any conventional type may be employed. Preferably, the shears are closed and opened by an air cylinder 46 having a piston rod 47 connected through toggle links 48 to the arms 49 carrying the blades. Air is admitted to opposite ends of the cylinder 46 to close the shears and quickly open them, by the air lines 50, 51 leading from a distributor valve assembly 52 associated with a timer, as hereinafter described.

My preferred means for subjecting the glass in the bell alternately to the influence of a partial vacuum and air at atmospheric pressure will now be described.

A pipe 55 leads from a suitable source of relatively high vacuum, not shown, through a vacuum regulator, represented generally by reference character 56, to a two-way valve casing 57. The source of vacuum preferably comprises a vacuum tank of substantial capacity and a vacuum pump, capable of pulling a vacuum corresponding to twenty six inches of mercury. The air line 30, which is connected at one end of the air bell, has its other end threaded in airtight relation in a boss 58 associated with the valve casing 57. A lateral boss 59 formed on the same casing supports a pipe 60 communicating through an adjustable valve 61 with atmosphere at 62. Within the valve casing 57 there is a rotatable plug valve body 63 having a diametric bore 64 therethrough, adapted, in the position shown, to establish communication directly through the valve casing, from the pipe 30 to the nipple 65 leading to the vacuum regulator. The valve body 63 is formed with an operating handle 66, whereby it may be rotated to bring a curved peripheral passage 67 into registry with the passages in the bosses 58, 59, thereby to establish communication between the pipe 30 and the pipe 60 leading to atmosphere. When in this position the valve body serves to close passage leading to the nipple 65 and the vacuum regulator (see Fig. 3).

The vacuum regulator preferably comprises a casing 70 having a diaphragm 71 associated therewith to form the bottom wall of a chamber 72, the chamber being in communication with the nipple 65 at one end and with a short conduit section 73 at the other. The diaphragm is preferably clamped in place between the lower edge of the casing 70 and a bottom, supporting casing section 74 which is supported on a platform 75. A pin 76, secured to the central portion of the diaphragm, extends upwardly through an appropriate stuffing box 77 associated with the top wall of the casing 70. The lower, reduced end of the pin 76 projects downwardly through the bottom casing section 74, and a suitable compression spring 78 surrounds the same and bears at its upper end against the casing 74 and at the lower end against the adjusting nuts 79, 80, or the like. It will be apparent that the spring 78 will tend to move the diaphragm 71 downwardly against atmospheric air pressure working on the lower surface of the diaphragm to overcome the partial vacuum in the chamber 72.

The short pipe section 73 is supported by a bracket 81 associated with the platform 75. At its end, it is connected to a valve casing 82 having a lateral boss 83 connected to the conduit 55 leading to the source of vacuum. Within the valve casing 82 there is disposed an upwardly opening poppet valve 84, fixed on a stem 85, guided in stuffing boxes 86, 87 at the lower and upper ends of the valve casing. A lever 88 is fulcrumed at 89 on a transverse shaft at the upper end of the bracket 81. One end of the lever is bifurcated, as at 90, to embrace a lateral pin associated with the upper end of the valve stem 85. The other end of the lever 88 is provided with a disc-like enlargement 91 contacting with and supported by the upper end of the pin 76 carried by the diaphragm 71. A weight 92 is mounted for longitudinal adjustment along the lever 88, so that its effective force may be varied, to augment the force of the spring 78. Thus, wide variations in the degree of vacuum which will be required in the chamber 72 to overcome the force of the weight 92 and the spring 78 to close the valve 84 may be effected. Broad adjustments are effected by shifting the position of the weight 92, and fine adjustments by changing the compression on the spring 78.

The platform 75 supports an air motor 95 having a piston rod 96 connected by a link 97 to the operating handle 66 of the valve body 63. Air under pressure is admitted to one end of the cylinder and exhausted from the other, alternately by any convenient means such as the timer valves 98, 99, which may be of any known type.

A suitable timer is shown diagrammatically in Figure 1 of the accompanying drawings. The several cam shafts 100, 101, 102, and 103 are interconnecting and are driven in opposite directions, as indicated by the associated arrows, at the same speeds. Air under pressure is conducted from a main line or manifold 104 to each valve casing, 98, 99, 105 and 106 and is admitted through a lateral port in each casing. Each casing to each valve assembly comprises a slidable valve body not shown, adapted to be urged inwardly by a plunger 107 having a roller in engagement with the cam on the associated shaft. The valve bodies and the plungers associated therewith are immediately returned to their initial, outwardly projected positions by exhaust air, as soon as the cam projections have moved out of engagement with the rollers. With the parts in the position shown in Figure 1, the plunger 107 associated with the valve assembly 99 has just been removed to the right by the cam fixed to the shaft 100. Air flows from the main line 104 through the valve body and out through the port 108 and line 109 to the port 110 at the left end of the cylinder 95, thereby shifting the valve 63 to the position shown, to establish communication between the bell 19 and the source of vacuum. The movement of the piston in the cylinder 95 causes a flow of exhaust air through the port 111 and conduit 112 to the port 108 associated with valve assembly 98. When the valve body in the casing 98 is in the left hand position, the exhaust air is conducted through port 113 and line 114 to a port 115 at the rear end of the valve casing 99. This air serves to immediately shift the valve body in the assembly 99 to the left, as the cam on the shaft 100 moves out of contact with the roller associated with the plunger 107. Each valve casing is provided with an exhaust port 116 which enables the actuating air to escape to atmosphere after it has shifted the valve body to the initial or starting position. If desired, an additional exhaust port may be provided.

The cam on the shaft 101 serves to shift the plunger 107 and the valve body in the casing 98 to the right, shortly after the parts in the valve casing 99 have been returned to the initial position. High pressure air then flows through the valve 98 and line 112 to the port 111 and the right hand end of the cylinder 95, to shift the valve 63 to the position shown in Figure 3 and to establish communication between the bell 19 and atmosphere. Exhaust air from the cylinder 95 flows through the port 110, the conduit 109 to the port 108 associated with the valve casing 99. Thence, this air flows through port 113 of valve 99, and through line 117 to the port 115 of casing 98, to shift the valve body therein and the plunger 107 back to their initial, or starting positions, as soon as the cam projection on shaft 101 has moved out of contact with the associated roller. This air is exhausted through the port 116 associated with valve casing 98 and both of the plungers are now disposed in their left hand, starting positions.

Instead of using the exhaust air, which is conducted from the cylinder through one valve to shift the other valve to the starting position, a spring or any equivalent means may be employed to return the valve plunger and the associated valve back to the original position as soon as the cam moves out of engagement with the roller carried by the plunger. In some cases, an arrangement of this kind is preferred, for the sake of simplicity.

Moreover, instead of using two valves and the two air lines 109 and 112 to shift the piston rod 96 associated with the cylinder 95 in the two directions, a single air line and a single valve may be employed to shift the piston in one direction against the action of a spring, which will return the piston and the valve 63 back to its normal position, as shown in Figure 3, with the pipe 30 in communication with atmosphere. In such a case, the shape of the cam should be adjustable, to vary the duration of the application of suction impulses to the air bell 19. Cams having adjustable lobes are known in the art and therefore need not be described in detail herein.

The cams on the cam shafts 100, 101, 102 and 103 are mounted for angular adjustment so that the timing of the operations of the valves 98, 99, 105 and 106 may be changed at will. For instance, each cam may be secured to its shaft by a set screw 125 or the like, as shown in Figure 4. It will also be understood that air is delivered to opposite ends of the shear motor 46, through the valves 105 and 106, in substantially the same manner as previously described, with reference to the air cylinder 95 and the valves 98 and 99.

The timer preferably includes a number of other cam shafts and valves, which serve to control the operations of an associated forming machine, so that the movements of the feeder and of the forming machine may be properly synchronized.

It is thought that the operation of the apparatus of the present invention will be apparent from a consideration of the foregoing description and the accompanying drawings.

At the instant that the parts assume the position shown in Figures 1 and 2, a partial vacuum exists in the chamber 72 above the diaphragm 71. This vacuum obviously will be transmitted through the passage 64 in the valve body 63, and through the pipe 30 into the interior of the bell to reduce the air pressure therein and to interrupt the flow of glass through the discharge orifice 17. A charge of glass of substantially the shape shown in Figure 1 will be hanging below the discharge orifice, and the shears will be actuated, as shown, to sever the charge. After the shear blades 45 have thus severed a charge, the stub is retracted by the partial vacuum in the bell 19. The atmospheric air which was formerly in the interior of the bell and in the tube 30, of course, immediately flows into the chamber 72 above the diaphragm, thereby considerably lowering the degree of partial vacuum therein. This action enables the weight 92 and the spring 78 to move the diaphragm downwardly and the valve 84 upwardly to open position. Thereupon, communication is established between the source of high vacuum and the chamber 72, so that the desired vacuum condition in that chamber and in the bell 19 is established immediately. The increase in the degree of vacuum in the chamber 72 raises the diaphragm 71 against the force of the weight 92 and the spring 78, thereby closing the valve 84 and preventing a creation of more than the desired degree of vacuum.

After a predetermined, usually very short interval of time, as pointed out below, the timer shaft 101 shifts the valve 98, thereby quickly reversing the air motor 95 and the valve body 63. As shown in Figure 3, the diametric aperture 64 is moved to inoperative position and the peripheral passage 67 is brought into registry with the passage in the boss 59 and the passage in the boss 58, thereby establishing communication between the pipe 60 and the pipe 30. As a result of this shifting of the valve, atmospheric air flows through the valve 61, pipe 60, and valve casing 57 to relieve the vacuum in the air line 30 and the interior of the bell 19. Thus, the glass in the bell is subjected to air at atmospheric pressure only, no positive, super-atmospheric pressures being possible. As a result, glass flows under the influence of gravity and the hydrostatic head of the glass in the bell, downwardly through the discharge orifice 17. When a sufficient quantity has been discharged and when a mold charge of the proper weight and diameter is hanging below the discharge orifice 17, the shears are operated to sever the charge from the connected body in the discharge orifice. The sheared charge falls by gravity to the forming machine and the valve 99 is actuated by the cam on the shaft 100 to cause the air motor 95 to shift the valve 63 so that suction is again applied to the line 30 and the air bell 19, whereupon the flow of glass is arrested and the cycle repeated.

As stated at the outset of the specification, the present invention contemplates numerous adjustable features, so as to make the apparatus highly flexible and adaptable for varying conditions. Thus, by changing certain adjustments, wide variations in the viscosity of the glass may be compensated for. Also, the adjustments enable the operator to change the shape of the mold charges to accommodate differently shaped molds. The weight of the charges may be varied between wide limits, to enable the feeder to deliver mold charges to machines which can be adjusted to make a wide variety of sizes of glass bottles or jars.

Where reference is made to changing the shapes of the charges, I mean that variations may be effected between relatively short thick cylindrical bodies or chunks, and long, thin cylinders or rods.

As pointed out above, the orifice ring 17 is removable, and many different sizes of rings may be substituted to change the diameter of the discharged stream of glass. In actual practice, it has been found that this feeder delivers a charge of glass considerably smaller in diameter than the orifice ring. At the commencement of flow, the stream will be substantially the same diameter as the orifice ring, but as the flow continues, the suspended charge elongates and decreases in diameter nearly evenly, from end to end.

Another important adjustable control is the timing of the shear action with respect to the commencement of flow. If the shear action is delayed, the charge will stretch out and become thinner, whereas if the action takes place earlier in the cycle, the charge will be shorter and thicker. Preferably the shears 45 and their actuating means 46, 49, are mounted for vertical adjustment on the post 53 so that the height of the shear blades with respect to the discharge orifice can be varied. This adjustment facilitates the coordination of weight control and shape control, when combined with the adjustment of the timing of the shears. For instance, if it is not desired to change the orifice ring and a somewhat longer and thinner, relatively light charge is desired, the shears can be lowered and the time of their shearing action delayed. The delayed shear action permits the charge to stretch out under the influence of gravity, and the lowering of the shears decreases the amount cut off and delivered to the molds on each shearing operation, whereby a charge of the kind desired is formed.

The adjustable gate 31 varies the effective size of the opening 21 in the side of the bell. Consequently, it determines the rate at which the glass can flow into the interior of the bell under the influence of gravity discharge and under the influence of suction applied to the upper end of the bell. This adjustment is important in controlling the weight of the charges delivered. When the gate is raised, more glass can flow into the bell and the weight of the charge is increased, assuming other factors to remain constant. When the gate is lowered the opposite effect is noted; i. e. lighter charges are delivered.

The timing of the applications of partial vacuum and atmospheric pressures to the glass in the bell is of major importance in determining weight and shape of the charges. Also, the degree of partial vacuum applied, and the rate of atmospheric air pressure recovery have notable effects on the charges. The degree of vacuum in the line can be determined by the vacuum gauge 54 associated with the line 30 and minor adjustments can be effected by the nuts 79, 80, to maintain the desired degree of vacuum. For major adjustments, the weight 82 can be shifted. The time of application of vacuum to the line 30 and the bell 19 is controlled by the position of the cams on the shafts 100 and the termination of the suction is controlled by the cam on the shaft 101. Thus, by shifting these cams, the portion of each cycle devoted to the application of vacuum and the portion during which atmosphere is effective, can be changed at will. Also, by shifting both cams the feeder cycle may be changed with respect to the shear cycle and/or the forming machine cycle.

The valve 61 is in the nature of a bleed valve and it may be adjusted to cause a short but variable time delay in the flow of atmospheric air into the system to relieve the vacuum, when the valve 63 is shifted to establish communication between the pipe 30 and the pipe 60. This valve 61 has been found useful in actual practice to prevent a too rapid inflow of atmospheric air into the system.

A specific example of the manner in which the feeder of the present invention has been and is being satisfactorily operated in commercial practice will now be given.

The machine is used to feed mold charges to a forming machine, timed to fabricate 19.8 quart size Mason jars per minute. Thus a complete feeder cycle takes 3.03 seconds. Twenty-six inches of vacuum are present at the source of vacuum, but the vacuum regulator is set to supply a vacuum of only two inches of mercury. The cams on the shafts 100 and 101 are timed to apply vacuum to the air bell substantially simultaneously with the shearing action. The vacuum is applied for only twenty-eight one hundredths of a second or about one-twelfth of each cycle, whereupon the valve 63 is shifted as quickly as possible to establish communication between the bell and atmosphere. The valve 61 is adjusted in such a manner that there is a short lag in the vacuum relief, of approximately three-tenths of a second. During the major portion of the cycle, and for a period of about two and forty-five hundredths seconds, the glass in the bell flows through the discharge orifice under the influence of atmospheric pressure only.

When operating in this manner, the temperature of the particular composition of glass used is 1940° F. The orifice ring has an opening three inches in diameter. The gobs fed are of substantially the shape shown in Figure 1. At the lower, rounded end, they measure substantially two and one-quarter inches in diameter and at the upper end, at the line of shear action, they are somewhat narrower, in the neighborhood of between one and three-quarters and two inches. The shears are spaced an appropriate distance below the orifice, and the gobs, when sheared, are approximately five inches long.

Of course, the operation of the feeder of the present invention is not limited to the figures given above in the specific example, as wide variations may be made, to suit varying conditions. The example is given for purposes of illustration only, and is in no sense, restrictive of the invention. Nor is the invention limited to the specific arrangement of parts shown in the accompanying drawings and described above, because the invention includes all changes coming within the scope of the appended claims and their equivalents.

I claim:

1. An apparatus for feeding mould charges of molten glass from a supply body, comprising a forehearth having a discharge opening in its floor, a refractory bell projecting downwardly into the glass with its lower end substantially contacting said floor and surrounding said opening, said bell having an opening in its side submerged in the glass, a movable gate for adjusting the effective size of said opening, a single air line connected to the upper end of the bell, a source of regulated vacuum, a single, two-way valve in said line for alternately connecting the bell to said source and to air at atmospheric pressure, means for shifting said valve in a regular cycle to subject the glass in the bell alternately to the influence of the regulated partial vacuum and to the influence of atmospheric pressure, and means for varying the timing of said valve shifting means to change the relative durations in said cycle of the application of said partial vacuum and of said atmospheric pressure.

2. A glass feeder for delivering mould charges from a discharge orifice in the floor of a forehearth, comprising an air bell in the forehearth surrounding said orifice and having an opening in its side wall submerged in the glass in the forehearth, shears spaced below said orifice, means for actuating said shears at predetermined time intervals, a single air line communicating with the interior of said bell, a source of regulated partial vacuum, a single two-way valve in said line adapted in one position to connect said line to said source of partial vacuum and in its other position to connect the same to a source of air at atmospheric pressure, means for shifting said valve from one position to the other in a regularly recurring cycle, and adjustable timing means for controlling the operations of said shear actuating means and said valve shifting means to effect variations in the time relationship of shearing operations and the applications of partial vacuum and atmospheric air pressures to the glass in said bell, thereby to control the weight and shape of the mould charges severed by said shears.

3. A glass feeder for delivering mould charges from a discharge orifice in the floor of a forehearth, comprising an air bell in the forehearth surrounding said orifice and having an opening in its side wall submerged in the glass in the forehearth, shears spaced below said orifice, means for actuating said shears at predetermined time intervals, a single air line communicating with the interior of said bell, a source of regulated partial vacuum, a single two-way valve in said line adapted in one position to connect said line to said source of partial vacuum and in its other position to connect the same to a source of air at atmospheric pressure, means for varying the effective size of the connection of said line to the source of air at atmospheric pressure, thereby controlling the time required to restore the pressure in said line and bell from the maximum partial vacuum to atmospheric pressure, means for shifting said valve from one position to the other in a regularly recurring cycle, and adjustable timing means for controlling the operations of said shear actuating means and said valve shifting means to effect variations in the time relationship of shearing operations and the applications of partial vacuum and atmospheric air pressures to the glass in said bell, thereby to control the weight and shape of the mould charges severed by said shears.

4. A glass feeder for delivering mould charges from a discharge orifice in the floor of a forehearth, comprising an air bell having an opening in its side submerged in the glass over the orifice, shears adapted to sever mould charges below the orifice, a single air line communicating with the interior of said bell, a source of partial vacuum and a source of air at atmospheric pressure, a single two-position valve in said line comprising a body having two spaced passages, each adapted to establish communication between said line and one of said two sources alternately in the two positions of said valve, and an adjustable valve between one of said passages in the valve body and said source of air at atmospheric pressure, said adjustable valve serving to provide an adjustable time delay in re-establishing atmospheric air pressure in the line and bell after each application of said partial vacuum in said line and bell.

5. An apparatus for feeding mould charges of molten glass from a supply body, comprising a forehearth having a discharge opening in its floor, a refractory bell projecting downwardly into the glass in the forehearth with its lower end substantially contacting said floor and surrounding said opening, a single air line leading from said bell, a source of vacuum, conduit means leading from said source, a vacuum regulator between said conduit means and said air line, a single valve housing and a two-way valve body therein, disposed in said line between said bell and said regulator, said valve housing having a port communicating with the vacuum regulator and another port communicating with atmosphere, and means for shifting the valve body to establish communication alternately between the line and the vacuum regulator and between the line and atmosphere, whereby a gravity flow of glass is effected under atmospheric pressure in the bell and such flow is arrested under the influence of a regulated partial vacuum in said bell.

6. An apparatus for feeding mould charges of molten glass from a supply body, comprising a forehearth having a discharge opening in its floor, a refractory bell projecting downwardly into the glass in the forehearth with its lower end substantially contacting said floor and surrounding said opening, said bell having an opening in its side wall immersed in the glass in the forehearth, means for controlling the effective size of said opening, a single air line leading from said bell to a source of vacuum, a vacuum regulator in said line, a valve housing and a two-way valve in the line between the bell and vacuum regulator, said valve housing having a port communicating with atmosphere, and means for shifting the valve to establish communication alternately between the bell and the vacuum regulator and between the bell and atmosphere.

7. An apparatus for feeding mould charges of molten glass from a supply body, comprising a forehearth having a discharge opening in its floor, a refractory bell projecting downwardly into the glass in the forehearth with its lower end substantially contacting said floor and surrounding said opening, said bell having a side opening in the glass in the forehearth, means for controlling the effective size of said opening, a single air line leading from said bell to a source of vacuum, a vacuum regulator in said line, a valve housing and a two-way valve in the line between the bell and vacuum regulator, said valve housing having a port communicating with atmosphere, a supplemental air valve adapted to control the effective size of said port, and means for shifting said two-way valve to establish communication alternately between the bell and the vacuum regulator and between the bell and atmosphere.

8. Means for controlling the flow of molten glass from a supply body enclosed in a bell above a discharge orifice in the floor of a forehearth, comprising a single air line leading to said bell, a source of relatively high vacuum, a vacuum regulator between the source and line, and valve means in the line between the regulator and the bell adapted alternately to establish connection between the line and regulator in one position and between the line and atmosphere in another position, said regulator comprising a chamber communicating with said line through said valve means when in the first mentioned position, a vacuum control valve between the chamber and the source of vacuum, a diaphragm in a wall of the chamber movable inwardly under the influence of a partial vacuum therein, a connection between said diaphragm and said control valve to close the latter upon inward movement of the former, means exerting a constant outward force on said diaphragm and tending to open the control valve, the force of said means being balanced and the valve being maintained closed by a predetermined partial vacuum in the chamber, said force serving to overbalance the diaphragm and open the valve upon lowering of the vacuum in the chamber resulting from establishing communication between the chamber and the line by the first mentioned valve means, thereby again serving to raise the vacuum in the chamber and line to said predetermined degree and again to close the valve, whereby the vacuum in the chamber and in the line and bell is maintained at a substantially constant maximum.

9. Means for controlling the flow of molten glass from a supply body enclosed in a bell above a discharge orifice in the floor of a forehearth, comprising a single air line leading to said bell, a source of relatively high vacuum, a vacuum regulator between the source and line and valve means in the line between the regulator and the bell adapted alternately to establish connection between the line and regulator in one position and between the line and atmosphere in another position, said regulator comprising a chamber communicating with said line through said valve means when in the first mentioned position, a downwardly closing vacuum control valve between the chamber and the source of vacuum, a diaphragm in the bottom wall of said chamber movable upwardly under the influence of a partial vacuum therein, a pin connected to said diaphragm projecting through the upper wall of the casing, a lever connection between said pin and said vacuum control valve to close the latter downwardly upon upward movement of the diaphragm, means exerting a constant downward force on the lever and diaphragm and an upward force on said valve tending to open the latter, the force of said means being balanced and said valve being maintained closed by a predetermined partial vacuum working on the diaphragm in said chamber, said force serving to overbalance the diaphragm and open said vacuum control valve when the first mentioned valve means establishes communication between the line and chamber and thereby lowers the vacuum in the chamber, the opening of said vacuum control valve serving to raise the degree of vacuum in the chamber and line to said predetermined degree and to close the control valve.

10. A vacuum regulator adapted to be interposed between a source of high vacuum and a conduit to control and maintain substantially constant, the degree of vacuum in the latter, said regulator comprising a chamber in communication with said conduit, a throttle valve between the chamber and said source, a diaphragm in the wall of said chamber movable inwardly under the influence of a partial vacuum therein, a connection between said diaphragm and said valve to close the latter upon inward movement of the former, means exerting a constant outward force on said diaphragm and a corresponding opening force on said valve, the force of said means being balanced and the valve being maintained closed by a predetermined partial vacuum in the chamber, said force serving to overbalance the diaphragm and to open the valve upon a lowering of the vacuum in said chamber, the opening of said valve again serving to raise the vacuum in the chamber to said predetermined degree, thereby to close the valve and maintain the vacuum in the chamber substantially constant.

11. The combination with a conduit leading to a source of relatively high vacuum from a vacuum operated machine which normally delivers limited quantities of atmospheric air to the conduit, of a regulator serving to maintain the vacuum in the conduit at a substantially constant, relatively low degree, said regulator comprising a control chamber, a diaphragm in the chamber, a control valve in the line leading to the source of high vacuum, a connection between said diaphragm and said valve, and means for applying an adjustable, constant force to said diaphragm and valve to open the latter when the vacuum in said control chamber working on said diaphragm reaches a predetermined minimum.

12. The combination with a conduit leading to a source of relatively high vacuum from a vacuum operated machine which normally delivers limited quantities of atmospheric air to the conduit, of a regulator serving to maintain the vacuum in the conduit at a substantially constant, relatively low degree, said regulator comprising a control chamber, a a diaphragm in the chamber, a control valve in the line leading to the source of high vacuum, a weighted lever connection between said diaphragm and said valve working against the force of the vacuum on the diaphragm, and an adjustable spring augmenting the force of the weighted lever, whereby a predetermined degree of vacuum operating on said diaphragm is necessary to overbalance the weight and the spring to close said control valve.

13. In combination, an air bell having its lower end immersed in molten glass in a forehearth over a discharge orifice in the floor thereof, a single air line leading to said bell, a source of relatively high vacuum, a vacuum reducer and regulator, a two-way valve in said line arranged to establish communication from the line to atmosphere in one position and from the line to the regulator in the other, the valve in the first position serving to close the passage to the regulator, said regulator comprising an outlet valve between the regulator and said source, and actuating means therefore movable to open the valve in response to a predetermined minimum degree of partial vacuum in the regulator and to close the same in response to a predetermined maximum degree of partial vacuum, said two-way valve serving to establish atmospheric air pressure in the line and bell in the first mentioned position and in the other position to establish a flow of said atmospheric air in the line and bell into the regulator, thereby diminishing the partial vacuum therein below said predetermined minimum and causing the outlet valve to open and the air to flow toward said source of vacuum until the vacuum in the line and regulator reaches the predetermined maximum.

14. Means for controlling, alternately, the flow of atmospheric air to an air bell associated with a glass feeder and the establishment of partial vacuum therein, said means comprising a single air line, a single two-way valve in the line, a vacuum regulator, a source of relatively high vacuum, and means for actuating said valve, the last mentioned means comprising an air motor having two normal positions, and connections between the motor and valve adapted in one position of the motor to hold the valve in position establishing communication from the line through the regulator to said source and in the other position of the motor to close the passage leading through the regulator and to open the line to atmosphere, said regulator comprising a valve, means for closing the same upon creation of a predetermined maximum vacuum in the regulator and means for opening the valve at a predetermined minimum, whereby the degree of vacuum in the line and bell cannot exceed said maximum.

15. An apparatus for delivering mould charges of molten glass from a supply body through a discharge opening in a forehearth floor, comprising a refractory bell projecting downwardly into the glass in alignment with said opening, a single air line connected to the upper end of the bell, a source of regulated vacuum, a single two-way valve in said line having passages positioned to connect the line alternately to the source of vacuum and to atmospheric air, and means for shifting said valve in a regular cycle to subject the glass in the bell alternately to the influence of said vacuum and to the influence of atmospheric air pressure, said valve shifting means comprising a cylinder, a piston therein, connections between the piston and the valve, and an adjustable timer for admitting activating air to opposite ends of the cylinder in a predetermined, variable time cycle.

SAMUEL E. WINDER.